US007350106B2

(12) United States Patent
Longere

(10) Patent No.: US 7,350,106 B2
(45) Date of Patent: Mar. 25, 2008

(54) DEVICE FOR AIDING THE LOCATING OF FAILURE OF A COMPLEX SYSTEM

(75) Inventor: Jean-Yves Longere, Gardanne (FR)

(73) Assignee: Eurocopter, Marignane Cedex (FR)

( * ) Notice: Subject to any disclaimer, the term of this patent is extended or adjusted under 35 U.S.C. 154(b) by 585 days.

(21) Appl. No.: 10/463,863

(22) Filed: Jun. 18, 2003

(65) Prior Publication Data
US 2004/0153864 A1 Aug. 5, 2004

(30) Foreign Application Priority Data
Jun. 19, 2002 (FR) .................................. 02 07553

(51) Int. Cl.
*G06F 11/00* (2006.01)
(52) U.S. Cl. .................... 714/25; 714/37; 714/799; 702/117
(58) Field of Classification Search ................ 714/25, 714/37, 799
See application file for complete search history.

(56) References Cited

U.S. PATENT DOCUMENTS

| 5,539,652 | A * | 7/1996 | Tegethoff ..................... 703/14 |
|---|---|---|---|
| 5,748,497 | A * | 5/1998 | Scott et al. .................. 702/181 |
| 5,983,364 | A * | 11/1999 | Bortcosh et al. ............... 714/25 |
| 6,205,563 | B1 * | 3/2001 | Lewis .......................... 714/47 |
| 6,226,760 | B1 * | 5/2001 | Burkhardt et al. ............. 714/33 |
| 6,338,149 | B1 * | 1/2002 | Ciccone et al. ............... 714/38 |
| 6,400,134 | B1 * | 6/2002 | Schuntermann .......... 324/158.1 |
| 6,587,960 | B1 * | 7/2003 | Barford et al. ................. 714/8 |
| 6,628,304 | B2 * | 9/2003 | Mitchell et al. ............. 715/734 |
| 6,633,782 | B1 * | 10/2003 | Schleiss et al. ............... 700/26 |
| 6,691,249 | B1 * | 2/2004 | Barford et al. ............... 714/25 |
| 6,751,577 | B2 * | 6/2004 | Sasaki et al. ................ 702/183 |
| 6,792,385 | B2 * | 9/2004 | Parker et al. ............... 702/179 |
| 6,856,939 | B2 * | 2/2005 | Everts et al. ............... 702/179 |
| 6,892,163 | B1 * | 5/2005 | Herzog et al. .............. 702/181 |
| 6,892,317 | B1 * | 5/2005 | Sampath et al. ............... 714/4 |
| 6,912,671 | B2 * | 6/2005 | Christensen et al. .......... 714/25 |
| 6,948,141 | B1 * | 9/2005 | Satya et al. .................... 716/4 |
| 6,988,053 | B2 * | 1/2006 | Namaky ..................... 702/183 |
| 7,158,917 | B1 * | 1/2007 | Bickford ..................... 702/181 |

(Continued)

OTHER PUBLICATIONS

I. Beniaminy et al., "Experience in diagnosing a remote, telecontrolled unit using the AITEST expert system," Test Conference, 1993. Proceedings., International Baltimore, MD, USA Oct. 17-21, 1993, New York, NY, USA, IEEE, Oct. 17, 1993, pp. 37-44, XP010148272.

(Continued)

*Primary Examiner*—Scott Baderman
*Assistant Examiner*—Loan Truong
(74) *Attorney, Agent, or Firm*—Stevens, Davis, Miller & Mosher, LLP

(57) ABSTRACT

A device for aiding the location of a failure within a complex system may include a database that stores diagnostic aid rules; a detector that detects a failure, if any, of the complex system and provides, upon a failure, information relating to the origin of this failure; and a central unit that determines, for any failure detected, on the basis of the diagnostic aid rules and the failure origination information, the element or elements of the complex system that may have caused the failure. Additionally, the central unit determines the corresponding probability that each element caused the failure for presentation to a user.

28 Claims, 1 Drawing Sheet

U.S. PATENT DOCUMENTS

| | | | |
|---|---|---|---|
| 2002/0010560 A1* | 1/2002 | Balachandran | 702/118 |
| 2002/0019870 A1* | 2/2002 | Chirashnya et al. | 709/224 |
| 2002/0050836 A1* | 5/2002 | Farnworth et al. | 324/765 |
| 2002/0097254 A1* | 7/2002 | Simmons | 345/705 |
| 2003/0084146 A1* | 5/2003 | Schilling et al. | 709/224 |
| 2003/0110412 A1* | 6/2003 | Neville | 714/25 |
| 2003/0195675 A1* | 10/2003 | Felke et al. | 701/29 |
| 2004/0153862 A1* | 8/2004 | Grellmann et al. | 714/43 |
| 2004/0225951 A1* | 11/2004 | Rose et al. | 714/819 |
| 2006/0136104 A1* | 6/2006 | Brozovich et al. | 701/29 |

OTHER PUBLICATIONS

Laurence J. Cooper et al., "Reasoning From Uncertain Data: A Bit Enhancement" Automatic Testing in the Next Decade and in the 21st. Century. Philadelphia, Sep. 25-28, 1989, Proceedings of the International Automatic Testing Conference, New York, IEEE, US, vol. Conf. 25, Sep. 25, 1989, pp. 146-149, XP000078705.

John W. Sheppard et al., "A neural network for evaluating diagnostic evidence" Aerospace and Electronics Conference, 1991. NAECON 1991., Proceedings of the IEEE 1991 National Dayton, OH, USA May 20-24, 1991, New York, NY, USA, IEEE, US, May 20, 1991, pp. 717-723, XP010048214.

Mary Nolan et al., "Re-engineering legacy tech manual's troubleshooting procedures into smart model-based diagnostics" AUTOTESTCON, 97, 1997 IEEE AUTOTESTCON Proceedings Anaheim, CA, USA Sep. 22-25, 1997, New York, NY, USA, IEEE, US, Sep. 22, 1997, pp. 1-7, XP010252988.

\* cited by examiner

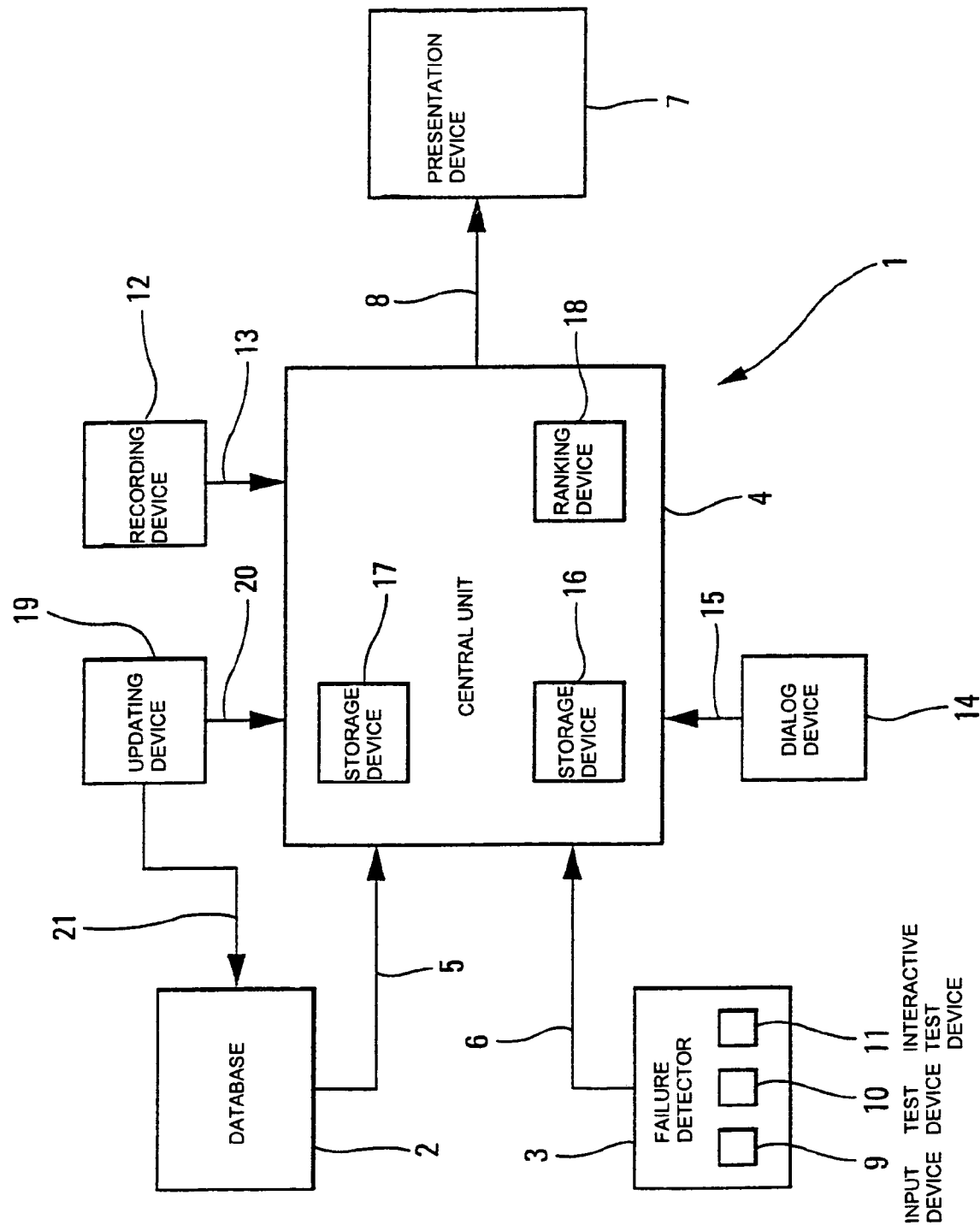

DEVICE FOR AIDING THE LOCATING OF FAILURE OF A COMPLEX SYSTEM

BACKGROUND OF THE INVENTION

The present invention relates to a device for aiding the locating of failure of a complex system.

DESCRIPTION OF THE PRIOR ART

Within the framework of the present invention, the expression complex system is understood to mean a system comprising a plurality of interlinked elements, such as electronic components and computers in particular, and therefore exhibiting very numerous interconnections. Complex systems such as these exist in very varied fields of activity, such as for example in industry, in the automotive sector or in aviation. These complex systems potentially pose problems to a maintenance operator with regard to locating a failure observed for example by a user of such a system, that is to say with regard to determining the (faulty) element or elements which are at the origin of this failure.

These complex systems generally employ integrated tests intended to detect and locate failures. However, technical limitations, and more so economic ones, do not allow these tests to cover the entirety of possible failures of the system. This is especially true with regard to the locating of a failed element. In complex systems, the locating rate is at best 90% (this percentage expresses the cases of failure for which a test makes it possible to unambiguously identify the failed element). Hence, at least 10% of cases still remain in which there is an ambiguity with regard to the location of the failure.

In these cases, the maintenance operator is led to dismantle equipment (elements) without being certain that they have actually failed. The maintenance operator may have means making it possible to confirm or to reject the diagnosis (test bench, complementary procedure, successive swaps of the suspect elements, manufacturer's on-line help, etc.), but the implementation of these means gives rise to operational constraints (availability of the test bench at the site of the fault for example) and in any event overhead costs. In the absence of these means (or should these means be out of action), the maintenance operator is constrained to return all the suspect elements (including the equipment which has not failed) for repair, thereby incurring a considerable overhead cost.

By way of illustration, it turns out that the rates of dismantling of elements whose fault is not ultimately confirmed vary, in modern complex systems, between 20 and 50%. These cases of nonconfirmation incur maintenance overhead costs which are without doubt, generally, between 15 and 30%.

SUMMARY OF THE INVENTION

The object of the present invention is to remedy these drawbacks. It relates to a device for aiding location of failure of a complex system, making it possible to remove any ambiguity regarding the location of any failure detected.

For this purpose, said device is noteworthy, according to the invention, in that it comprises:

at least one database storing diagnostic aid rules;
detection means for detecting a functional failure, if any, of said complex system and for providing, upon the detection of a failure, information relating to the origin of this failure;
a central unit determining, for any failure detected, at least on the basis of said diagnostic aid rules stored in said database and of the information provided by said detection means, the element or elements of the complex system which are at the origin of said failure, as well as for each element thus determined the corresponding probability that it is at the origin of this failure; and
presentation means for presenting to an operator, for any failure, the element or elements determined as being at the origin of the failure together with on each occasion the corresponding probability.

Thus, by virtue of the invention, for each failure detected, one knows not only the element (or the various elements) that is suspected of being at the origin of this failure, but also the corresponding probability that it is actually at the origin of this failure. This affords a valuable aid to an operator for maintaining the complex system in order to know whether or not he has to dismantle an element that may be faulty.

Advantageously, said database stores at least some of the following rules:

reliability data relating to various elements of said complex system;
pre-established diagnostics that directly associate a failure locating result with the result of at least one particular test, implemented by the detection means; and
selection rules which are imposed on the central unit.

Moreover, advantageously, said detection means comprise:

test means which are integrated into said complex system; and/or
at least one interactive test means; and/or
at least one means allowing an operator to input information relating to a failure and to its origin into said device.

Additionally, advantageously, said central unit determines the element or elements at the origin of a failure together with on each occasion the corresponding probability:

by using at least one pre-established diagnostic of the aforesaid type; and/or
by calculating said probability with the aid of the ratio of the sum of the failure rates of all the failures covered by a test in said element to the sum of the failure rates of all the failures covered by this test in the entire complex system.

Moreover, in a preferred embodiment, said central unit determines, for an element C at the origin of a failure, the corresponding probability with the aid of the ratio $\Sigma C/\Sigma total$, in which:

$\Sigma C$ is a sum characteristic of the element C and corresponds to the sum of the failure products of the various components of said element C;
the failure product of a particular component corresponds to the product of result parameters of various tests monitoring the element of which said particular component forms part, the result parameter of a test being equal:
to 1, if the test does not monitor this component;
to 0, if the test monitors this component, but does not detect any fault;
to the failure rate of said component, if the test monitors this component and detects a fault; and
$\Sigma total$ corresponds to the sum of the various sums characteristic of all the elements of the complex system which are monitored by these tests.

Moreover, advantageously, said device comprises a recording means for recording, upon the detection of a failure, operational parameters available on the complex system, and said central unit also uses these operational parameters to determine the element at elements at the origin of the failure, as well as the corresponding probability.

Additionally, said presentation means present on a readable support (display screen or printed support), at least one of the following presentations:
- a list of elements of the complex system together with the associated probability of being at the origin of a failure;
- an illustration of the various probabilities according to a set of different colors; and
- a schematic diagram of the complex system together with a portrayal of the probability of various elements thereof.

Moreover, advantageously, said presentation means moreover present, on said readable support, complementary information relating to failure location.

Additionally, the device in accordance with the invention furthermore comprises:
- a means of dialog allowing an operator to undertake a dialog with said device; and/or
- a means of updating allowing an operator to update at least one of the following means of said device: the database and the central unit; and/or
- storage means for storing the information emanating from the detection means; and/or
- storage means for storing auxiliary information which are able to be presented to an operator by said presentation means; and/or
- means for chronologically ranking the results emanating from the central unit.

BRIEF DESCRIPTION OF THE DRAWING

The single FIGURE of the appended drawing will elucidate the manner in which the invention may be embodied. This FIGURE is the schematic diagram of a device in accordance with the invention for aiding the locating of failure of a complex system.

DESCRIPTION OF THE PREFERRED EMBODIMENTS

The device 1 in accordance with the invention and represented diagrammatically in the FIGURE is intended to aid the detection and the location of the failures (faults) of a complex system (not represented), in particular an aircraft, for example a helicopter. A complex system such as this comprises a plurality of elements (electronic, mechanical components, etc.) which are interlinked, and a failure of said complex system is generally due to a malfunctioning (or a fault) of one of said elements, which must then be dismantled so as to be repaired or replaced.

According to the invention, said device 1 comprises:
- at least one database 2, of standard type, storing diagnostic aid rules specified hereinbelow;
- detection means 3 for detecting a functional failure, if any, of said complex system and for providing, upon the detection of a failure, information relating to the origin of this failure;
- a central unit 4 connected by links 5 and 6 respectively to said database 2 and to said detection means 3 and determining, for any failure detected, at least on the basis of said diagnostic aid rules stored in said database 2 and of the information provided by said detection means 3, the element or elements of the complex system which are at the origin of said failure, as well as for each element thus determined the corresponding probability that it is at the origin of this failure; and
- presentation means 7 which comprise for example a display screen and/or a printer, which are connected by a link 8 to the central unit 4 and whose object is to present to an operator, for any failure, the element or elements determined as being at the origin of the failure together with on each occasion the corresponding probability.

Thus, by virtue of said device 1 in accordance with the invention, one knows, for each failure detected, not only the element or the various elements which are regarded as being at the origin of this failure, but also their probability of being at the origin of this failure. Thus, for a particular failure, it is possible for example to obtain the information according to which an element A has a 90% chance of being at the origin of the failure and hence of being faulty, an element B has a 7% chance and an element C has a 3% chance. This affords a valuable aid to an operator for maintaining the complex system, in order to know whether or not he has to dismantle an element which may be faulty (for example, dismantling required for the element A of the above example).

The detection means 3 for detecting the functional failures of the monitored complex system may be formed so as to implement standard detection techniques.

In a particular embodiment, said detection means 3 comprise however:
- a means 9, such as an alphanumeric keypad for example, allowing an operator to input information relating to a failure and to its origin into said device 1, in particular by compiling a description of the symptom observed (perhaps by using a codified list of possible symptoms); and/or
- test means 10 which are integrated into said complex system.
- These test means 10 may implement hardware tests which check the hardware integrity of the complex system and/or functional tests which verify the integrity of the functions carried out by said system. They may be active throughout the operation of the system or only during one or more specific test phases; and/or
- an interactive test means 11 (that is to say one requiring an action from a maintenance operator) to refine the diagnosis.

Additionally, said database 2 which contains the information necessary to the central unit 4, for compiling the probabilities of fault of the elements on the basis of the results of the tests carried out by the detection means 3, stores at least some of the following rules:
- reliability data relating to various elements of said complex system. These reliability data may emanate from reliability compendia ("MIL HDBK 217F" for electronic components for example). They may also be derived from feedback from the experience of the manufacturer or of the user of the complex system. It is also possible to use information combining the above two sources;
- selection rules which are imposed on the central unit 4 in respect of choice in the compiling of the diagnostic strategies; and
- pre-established diagnostics which directly associate a locating result with the result of at least one test implemented by the detection means 3, that is to say that with a test result is associated the list of suspect equipment (elements) together with the probability of having actually failed. These pre-established diagnostics are based on studies, feedback of experience and/or expert opinions.

In the latter case, said central unit 4 therefore determines the element or elements at the origin of a failure together with, on each occasion, the corresponding probability, by using at least one such pre-established diagnostic.

The latter procedure can, for example, be used when no ambiguity of location remains following the test, in particular when all the fault modes monitored by the test are situated on the same element. It is, in this case, faster to associate a 100% failure probability with the incriminated element, rather than to carry out a calculation for all the elements.

The diagnosis can also emanate from statistical exploitation of feedback from experience. For example, after observing with regard to the results of a particular test that the origin of a fault is due in 80% of cases to an element A and 20% to an element B, these proportions will be restored again in the form of fault probability when this particular test is positive. The diagnosis can also be formulated directly through expert opinion. Finally, bayesian techniques can be used to mix feedback from experience with expert opinions and/or a formal projection.

Preferably, the processing implemented by the central unit 4 uses the results of several tests so that elements suspected by a first positive test may, for example, be vindicated by one or more other negative tests.

In a first simplified embodiment, the central unit 4 calculates the failure probability of an element on the basis of the ratio of the sum of the failure rates [a failure rate is the probability that an element will develop a fault during a given time, for example during one hour (h)] of all the failures covered by a particular test in this element to the sum of the failure rates of all the failures covered by this particular test in the entire complex system.

The sum of the failure rates of the failure modes covered by the test can be compiled on the basis of the reliabilities of the components of the various elements. It may also involve an approximate value giving for a test the proportion covered by the test of each element of the system. By multiplying these proportions by the respective reliabilities, one then obtains the numerators and denominators of the aforesaid ratio.

Thus, by way of illustration, when two elements A and B are suspect, the respective probabilities pA and pB can be determined on the basis of the following expressions:

$$\begin{cases} pA = \dfrac{\sum A}{\sum A + \sum B} \\ pB = \dfrac{\sum B}{\sum A + \sum B} \end{cases}$$

in which:
$\Sigma A$ represents the sum of the reliabilities of the various components tested in element A, the reliability being expressed as a failure rate;
$\Sigma B$ represents the sum of the reliabilities of the various components tested in element B; and
$\Sigma A+\Sigma B$ represent the sum of the reliabilities of the various components tested in the entire complex system.

Additionally, in a second preferred embodiment, said central unit 4 determines, for an element C at the origin of a failure, the corresponding probability pC with the aid of the ratio $\Sigma C/\Sigma total$, in which:

$\Sigma C$ is a sum characteristic of the element C and corresponds to the sum of the failure products of the various components of said element C;

the failure product of a particular component corresponds to the product of result parameters of various tests monitoring the element of which said particular component forms part, the result parameter of a test being equal:

to 1, if the test does not monitor this component;

to 0, if the test monitors this component, but does not detect any fault;

to the failure rate of said component, if the test monitors this component and detects a fault; and $\Sigma total$ corresponds to the sum of the various sums characteristic of all the elements of the complex system which are monitored by these tests.

This second embodiment is illustrated on the basis of the following example which comprises two elements (items of equipment) C and D, each of them comprising four components: C11 to C14 for element C and C21 to C24 for element D. The various tests are denoted T1, T2, T3, . . .

For these tests, symbols "X", "0" and "1" are provided, such that:

for "X", the test does not monitor the corresponding component;

for "0", the test monitors the component, but does not detect any fault;

for "1", the test monitors the component and detects a fault.

| Equipment | | T1 | T2 | ... | T3 | Failure rate | Failure product |
|---|---|---|---|---|---|---|---|
| C | C11 | X | 1 | | X | $1.10^{-6}/h$ | $1.10^{-6}/h$ |
| | C12 | 0 | 1 | | 1 | $3.10^{-6}/h$ | 0 |
| | C13 | 0 | X | | X | $2.10^{-6}/h$ | 0 |
| | C14 | 0 | X | | 1 | $4.10^{-6}/h$ | 0 |
| $\Sigma C$ | | | | | | | $1.10^{-6}/h$ |
| D | C21 | 0 | X | | 1 | $2.10^{-6}/h$ | 0 |
| | C22 | 0 | X | | X | $3.10^{-6}/h$ | 0 |
| | C23 | X | X | | 1 | $2.10^{-6}/h$ | $2.10^{-6}/h$ |
| | C24 | 0 | X | | X | $4.10^{-6}/h$ | 0 |
| $\Sigma D$ | | | | | | | $2.10^{-6}/h$ |

$\Sigma C$ and $\Sigma D$, which are the sums of the failure products of C11 to C14 and of C21 to C24 respectively, therefore satisfy:

$$\begin{cases} \sum C = 1.10^{-6}/h \\ \sum D = 2.10^{-6}/h \end{cases}$$

Furthermore, $\Sigma total=\Sigma C+\Sigma D=3.10^{-6}/h$.

One therefore obtains the respective probabilities pC and pD of the elements C and D, on the basis of the following expressions:

$$\begin{cases} pC = \dfrac{\sum C}{\sum total} = \dfrac{1}{3} \\ pD = \dfrac{\sum D}{\sum total} = \dfrac{2}{3} \end{cases}$$

Consequently, the element suspected first is element D.

It will be noted that the inventory of faults and the inventory of failure rates have previously been stored in specific facilities of the device.

With this second embodiment, one envisages better fault locating performance, a reduction in ambiguities and a reduction in the rates of unconfirmed dismantling from 15 to 20%.

Additionally, the device 1 furthermore comprises a recording means 12 for recording, upon the detection of a failure, operational parameters available on the complex system. The central unit 4 which is connected by a link 13 to this recording means 12 also uses said operational parameters to determine the element or elements at the origin of the failure, as well as the corresponding probability.

These operational parameters may therefore aid in removing an ambiguity, if any, regarding location of a failure. For example, in the event of a discrepancy in two altitude values on an aircraft originating from two different sources (elements), the recording means 12 records, at the moment of observation of this discrepancy, these two altitude values. The likelihood of each of the two values in the flight phase considered may then be used to remove the ambiguity of fault between the two elements. It is also possible to imagine this operation being automatic by integrating a third source of information, possibly indirect, providing for example a speed, in particular if it is impossible for the aircraft to be at certain speeds below the altitude in question.

Additionally, said presentation means 7 present on a readable support (screen, paper support, etc.) at least one of the following presentations:

- a list of the various elements of the complex system together with the associated probability of being at the origin of a failure possibly limiting this list to the elements whose probability is non zero);
- an illustration of the various probabilities according to a set of colors (for example, red for a probability of greater than 90%, orange for a probability of greater than 50% and of less than or equal to 90%, and yellow for a probability of less than or equal to 50%); and
- a schematic diagram (possibly limited to the defective function alone or to the suspect elements alone) together with the fault probability (or the color code) inserted into each element.

Said presentation means 7 moreover present, on said readable support, complementary information relating to failure location, such as:

- the summary of the positive tests at the origin of the diagnosis;
- the data and the selection rules used for the diagnosis; and
- maintenance guidelines, dependent on the diagnosis (possibly by coupling up with electronic maintenance documentation).

Additionally, the device 1 in accordance with the invention may furthermore comprise a means of dialog 14 allowing an operator to undertake a dialog with said device 1, and in particular with the central unit 4 (link 15), so as for example:

- to reset the failure probabilities, after a replacement trial or the implementation of complementary tests (for example when three elements are suspect and when the replacement of a first element has given nothing, to request a reassignment of the probabilities over the remaining two suspect elements); or
- to integrate maintenance constraints, possibly by coupling up with GMAO (Computer Aided Maintenance Management) tools, for example to take account of information to the effect that one of the suspect elements is out of stock.

Moreover, the device 1 also comprises:

- storage means 16 for storing the information emanating from the detection means 3. Maintenance not necessarily having to be performed immediately after observing the failure (for example, in the case of an embedded application, for which maintenance is performed following return to site), it may be preferable to postpone the diagnosis. In the latter case, said storage means 16 provide for the storage of the detection test results; and
- storage means 17 for storing auxiliary information which are able to be presented to a maintenance operator by said presentation means 7.

The object of said storage means 17 is therefore to supplement the probability information with auxiliary information so as to aid the maintenance operator in his dismantling choices. This auxiliary information may be:

- dismantling constraints (accessibility, importance of integrity verification test, risk of impairment);
- reassembly constraints (absence of or need for adjustment);
- operational constraints (absence of such type of qualified personnel);
- availability of stocks; and
- the existence of complementary test procedures (kits, test benches).

This auxiliary information may be preprogrammed by the manufacturer and, possibly, be enhanced or customized by the user. Certain rules make it possible in particular to amend the refurbishment strategy, on the basis of this information, by modifying for example the recommended order of dismantling. These amendments may be integrated a priori by the manufacturer (in the form, for example, of corrective factors integrated within the fault probabilities or more exactly within the suggested order of dismantling) and, possibly, be corrected by the user of the device 1.

Additionally, the device 1 also comprises means 18 for chronologically ranking the results emanating from the central unit 4, on the basis of the symptoms described by the operator and/or of the results of the detection tests (detection means 3). The use of these means 18 can in particular allow:

- the user of the complex system to optimize his diagnoses, by regularly associating the actual location of the fault with the results of the tests. He may thus benefit from the experience acquired with respect to similar problems which have already posed location problems to him;
- the compiling of statistics regarding the observed scenario of tests and of diagnoses so as, for example, to gear optimizations toward the most frequent or most troublesome scenarios; and
- the manufacturer to improve the device 1 by correlating the tests and the location of the fault.

Said device 1 can furthermore comprise a means of updating 19 allowing an operator to update at least one of the following means of said device: the central unit (link 20) and the database 2 (link 21).

Several types of update may be envisaged:

integration of new diagnoses pre-established with regard to experience acquired during usage;

integration into the calculation of probability of data actually observed together with rules of the kind "in 90% of cases, where element C has been signaled as faulty, it was actually faulty";

updating of the databases of projected occurrence of the failure modes, by feedback of experience regarding reliability;

substitution of observed data for these projected data;

merging of the observed and projected data (for example through bayesian techniques); and integration of new projected data (for example following the modification of the reliability compendium standards).

The invention claimed is:

1. A device for aiding the locating of a failure of a complex system comprising a plurality of interlinked elements, which device comprises:

at least one database storing diagnostic aid rules;

a detector that detects a functional failure, if any, of said complex system and provides, upon detection of said failure, information relating to the origin of said failure;

a central unit that determines, for any said failure detected, at least on the basis of said diagnostic aid rules stored in said database and of the information provided by said detector, the element or elements of the complex system which are at the origin of said failure, as well as for each element thus determined the corresponding probability that it is at the origin of said failure;

a presentation section that presents to an operator, for any said failure, the element or elements determined as being at the origin of the failure together with on each occasion the corresponding probability; and an updating section that updates the database under the control of an operator, wherein:

said central unit determines, for an element at the origin of said failure, the corresponding probability with the aid of the ratio of the sum of the failure rates of all the failures covered by a test in said element to the sum of the failure rates of all the failures covered by this test in the entire complex system.

2. The device as claimed in claim 1, wherein said database stores at least some of the following rules:

reliability data relating to various elements of said complex system;

pre-established diagnostics that directly associate a failure locating result with the result of at least one particular test, implemented by the detector; and selection rules which are imposed on the central unit.

3. The device as claimed in claim 1, wherein said detector comprises a test section that is integrated into said complex system.

4. The device as claimed in claim 1, wherein said detector comprises at least one interactive test section.

5. The device of claim 1, wherein said detector comprises at least one input section that allows an operator to input information relating to (i) said failure and (ii) origin of said failure into said device.

6. The device as claimed in claim 1, wherein said central unit determines the element or elements at the origin of said failure together with on each occasion the corresponding probability, by using at least one pre-established diagnostic.

7. The device as claimed in claim 1, which furthermore comprises a recorder that records, upon the detection of said failure, operational parameters available on the complex system, and wherein said central unit also uses said operational parameters to determine the element or elements at the origin of the failure, as well as the corresponding probability.

8. The device as claimed in claim 1, wherein said presentation section presents on a readable support, at least one of the following presentations:

a list of elements of the complex system together with the associated probability of being at the origin of said failure;

an illustration of the various probabilities according to a set of different colors; and a schematic diagram of the complex system together with a portrayal of the probability of various elements thereof.

9. The device as claimed in claim 8, wherein said presentation section presents, on said readable support, complementary information relating to failure location.

10. The device as claimed in claim 1, which furthermore comprises a dialog section that allows an operator to undertake a dialog with said device.

11. The device as claimed in claim 1, which furthermore comprises a storage section that stores the information emanating from the detector.

12. The device as claimed in claim 1, which furthermore comprises a storage section that stores auxiliary information which for being presented to an operator by said presentation section.

13. The device as claimed in claim 1, which furthermore comprises a ranking section that chronologically ranks the results emanating from the central unit.

14. A complex system, which comprises a device for aiding failure location, such as that specified under claim 1.

15. A device for aiding the locating of a failure of a complex system comprising a plurality of interlinked elements, which device comprises:

at least one database storing diagnostic aid rules;

a detector that detects a functional failure, if any, of said complex system and provides, upon detection of said failure, information relating to the origin of said failure;

a central unit that determines, for any said failure detected, at least on the basis of said diagnostic aid rules stored in said database and of the information provided by said detector, the element or elements of the complex system which are at the origin of said failure, as well as for each element thus determined the corresponding probability that it is at the origin of said failure;

a presentation section that presents to an operator, for any said failure, the element or elements determined as being at the origin of the failure together with on each occasion the corresponding probability; and an updating section that updates the database under the control of an operator, wherein:

said central unit determines, for an element C at the origin of said failure, the corresponding probability with the aid of the ratio $\Sigma C/\Sigma total$, in which:

$\Sigma C$ is a sum characteristic of the element C and corresponds to the sum of the failure products of the various components of said element C;

the failure product of a particular component corresponds to the product of result parameters of various tests monitoring the element of which said particular component forms part, the result parameter of a test being equal:
- to 1, if the test does not monitor this component;
- to 0, if the test monitors this component, but does not detect any fault;
- to the failure rate of said component, if the test monitors this component and detects a fault; and Σtotal corresponds to the sum of the various sums characteristic of all the elements of the complex system which are monitored by these tests.

16. The device as claimed in claim 15, wherein said database stores at least some of the following rules:
- reliability data relating to various elements of said complex system;
- pre-established diagnostics that directly associate a failure locating result with the result of at least one particular test, implemented by the detector; and
- selection rules which are imposed on the central unit.

17. The device as claimed in claim 15, wherein said detector comprises a test section that is integrated into said complex system.

18. The device as claimed in claim 15, wherein said detector comprises at least one interactive test section.

19. The device of claim 15, wherein said detector comprises at least one input section that allows an operator to input information relating to (i) said failure and (ii) origin of said failure into said device.

20. The device as claimed in claim 15, wherein said central unit determines the element or elements at the origin of said failure together with on each occasion the corresponding probability, by using at least one pre-established diagnostic.

21. The device as claimed in claim 15, which furthermore comprises a recorder that records, upon the detection of said failure, operational parameters available on the complex system, and wherein said central unit also uses said operational parameters to determine the element or elements at the origin of the failure, as well as the corresponding probability.

22. The device as claimed in claim 15, wherein said presentation section presents on a readable support, at least one of the following presentations:
- a list of elements of the complex system together with the associated probability of being at the origin of said failure;
- an illustration of the various probabilities according to a set of different colors; and
- a schematic diagram of the complex system together with a portrayal of the probability of various elements thereof.

23. The device as claimed in claim 22, wherein said presentation section presents, on said readable support, complementary information relating to failure location.

24. The device as claimed in claim 15, which furthermore comprises a dialog section that allows an operator to undertake a dialog with said device.

25. The device as claimed in claim 15, which furthermore comprises a storage section that stores the information emanating from the detector.

26. The device as claimed in claim 15, which furthermore comprises a storage section that stores auxiliary information which for being presented to an operator by said presentation section.

27. The device as claimed in claim 15, which furthermore comprises a ranking section that chronologically ranks the results emanating from the central unit.

28. A complex system, which comprises a device for aiding failure location, such as that specified under claim 15.

* * * * *